United States Patent [19]

Vind

[11] 4,272,714
[45] Jun. 9, 1981

[54] STARTER DEVICE FOR A SINGLE-PHASE ASYNCHRONOUS MOTOR

[75] Inventor: Holger V. Vind, Nordborg, Denmark

[73] Assignee: Danfoss A/S, Nordborg, Denmark

[21] Appl. No.: 38,461

[22] Filed: May 14, 1979

[30] Foreign Application Priority Data

May 16, 1978 [DE] Fed. Rep. of Germany ....... 2821253

[51] Int. Cl.$^3$ .............................................. H02P 1/44
[52] U.S. Cl. ..................................... 318/783; 310/71; 318/188; 318/792; 318/794
[58] Field of Search .............. 318/778, 794, 795, 783, 318/788, 784, 792; 310/68 D, 71; 338/220, 221; 339/32 M

[56] References Cited

U.S. PATENT DOCUMENTS

| | | | |
|---|---|---|---|
| 3,231,767 | 1/1966 | Powell | 310/71 |
| 3,619,641 | 11/1971 | Ballard | 310/71 |
| 3,988,709 | 10/1976 | McKinnon et al. | 338/220 |
| 4,092,573 | 5/1978 | D'Entremont | 318/783 |
| 4,131,871 | 12/1978 | Haag et al. | 338/220 |

Primary Examiner—David Smith, Jr.
Attorney, Agent, or Firm—Wayne B. Easton

[57] ABSTRACT

The invention relates to a starter device for single phase, asynchronous motors, the starter device being of the type which provides a PTC resistor for series starting operation with the auxiliary winding. The starter device may be used for different types of motors by reason of an arrangement of contacts for connecting the main and auxiliary windings, starting capacitors and a two phase power supply which accommodates different modes of starting operation required by different motors.

Three capacitor contacts provide for connecting capacitors in different ways relative to the PTC resistor and one of two sets of winding contacts may be selected to suit a desired mode of starting operation.

3 Claims, 6 Drawing Figures

STARTER DEVICE FOR A SINGLE-PHASE ASYNCHRONOUS MOTOR

The invention relates to a starter device for a single-phase asynchronous motor, comprising a PTC resistor connectible in series with the auxiliary winding, and a housing carrying first and second contacts for connecting the two mains leads, a third contact for connecting the common pole of the main and auxiliary windings, a fourth contact for connecting the other pole of the main winding and a fifth contact for connecting the other pole of the auxiliary winding, the first contact being connected to the third contact and the second contact being connected to the fourth contact and, by way of the PTC resistor, to the fifth contact.

In a known starter device of this kind, the PTC resistor is accommodated in the form of a cylindrical disc in a housing provided with air apertures. A flat housing extension carries three parallel plug sockets arranged at the ends of a triangle for plug-connecting a three-pole lead-through as is usual with encapsulated refrigerators and two spade-like contacts for connecting the mains leads to the opposite side of the flat housing extension. This enables a resistance start to be achieved for which the time within which the PTC resistor becomes heated to the high ohmic condition determines the starting period. This starter device is designed for a special type of motor or a special manner of operation.

It is also known to provide starter devices with a starting condenser in series with the PTC resistor and/or an operating condenser in shunt connection. The starter devices so constructed are likewise suitable only for a particular type of motor or a particular manner of operation.

The invention is based on the problem of providing a starter device of the aforementioned kind which can be used for different types of motors or manners of operation and is preferably universally applicable.

This problem is solved according to the invention by a sixth contact connected to the fourth contact, a seventh contact connected to the fifth contact, an eighth contact, and a ninth contact connected to the latter.

Such a starter device can be used as a basic constructional block for every kind of starting operation. A resistance start is obtained when none of the additional contacts is used. A condenser start is obtained when a starting condenser is connected between the seventh and eighth contacts, it being necessary for the one pole of the auxiliary winding to be connected to the ninth contact instead of the fifth contact. In both cases, an operating condenser can be connected between the sixth and seventh or between the sixth and eighth contacts. All these features do not call for switching within the starter device but merely appropriate application of the external connections.

When the third, fourth and fifth contacts are disposed as parallel plug sockets at the corners of a triangle, as is usual in connection with an encapsulated compressor for placing on the three-pole lead-through, there is preferably a second plug contact arrangement arranged in the form of a like triangle and consisting of the third contact, the ninth contact disposed adjacent to the fifth contact, and a tenth contact which is disposed adjacent to the fourth contact and connected thereto. The change from the fifth to the ninth contact required for connecting the starting condenser is obtained merely by plugging the second instead of the first triangle onto the three-pole lead-through.

A particularly favourable arrangement of contacts is achieved if the contacts for connecting the motor windings are disposed at one end face and the other contacts at the peripheral face of the housing. Such a starter device can for example be plugged onto a three-pole lead-through without the connections at the other contacts colliding therewith. Nevertheless, the other end face of the housing remains free for other purposes. Naturally one can also use such a starter device for conventional motors irrespective of whether the corresponding connecting leads are connected to the contacts at the end face or to the appropriate contacts at the peripheral face, it being possible to use the contacts at the end face for connecting the condensers.

Even greater versatility in use is achieved if the housing is closed, the PTC resistor is in thermally conductive contact with the housing end wall which is free from contacts but otherwise thermally insulated from the housing, and if the end wall consists of electrically insulating but thermally conductive material. In this way the dissipation of heat from the PTC resistor to the surroundings is restricted to the end wall of the housing that is free from contacts. Every provision made at this end wall therefore has direct influence on the operating behaviour. If one insulates the free end wall one obtains a comparatively short starting period, a very low consumption of energy during operation but very slow cooling. This is advantageous for an asynchronous motor with comparatively long down times, e.g. three minutes, as is the case for refrigerator compressors. For longer starting and shorter cooling-off periods, one can apply the free end face direct to the heat-dissipating metal portion. In this case one must, however, apply more heat during operation. By selecting suitably dimensioned cooling plates which are applied to the free end wall, one can achieve the optimum conditions for every motor or its manner of operation.

In this case it is particularly favourable if the end wall is provided with a plug-on member influencing the dissipation of heat.

The invention will now be described in more detail with reference to preferred examples shown in the drawings, wherein:

FIG. 2 shows a cooling plate that can be plugged on;

FIG. 3 shows an insulating cover that can be plugged on;

Figure 1:
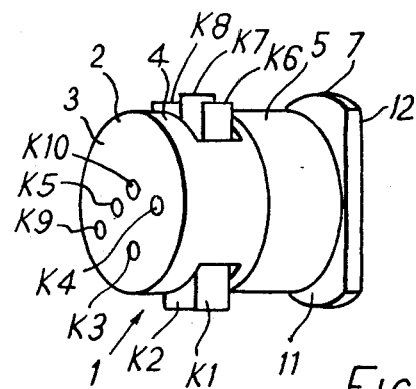
FIG. 1 is a pictorial view of the starter device according to the invention.

The starter device of FIG. 1 comprises a substantially cylindrical housing 1, consisting of three portions, namely an end portion 2 with an end face 3 and peripheral face 4 in which contacts are accommodated, a central portion 5 for receiving the PTC resistor 6, and an end wall 7 of electrically insulating but thermally conductive material such as glass. These three portions are for example interconnected by adhesive. The PTC resistor 6 has two electrodes 8 and 9. The electrode 8 is thermally conductively applied to the end wall 7 and is otherwise arranged in a chamber 10 which is filled with a thermally insulating material such as dry air or a plastics foam material. The end wall 7 has a flange 11 with two flats 12 for the easier application of plug-on members.

Figure 2:
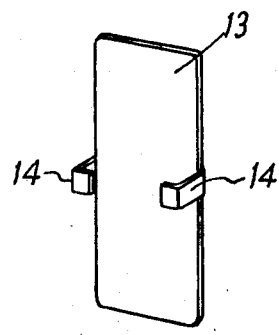
Figure 4:
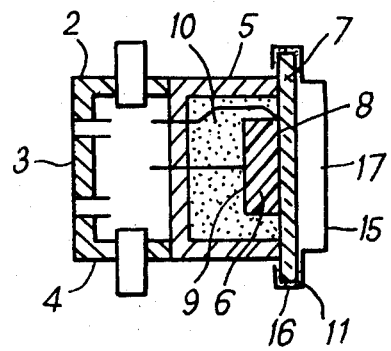
FIG. 4 is a diagrammatic longitudinal section through the starter device.

A plug-on member in the form of a coiling plate 13 is shown in FIG. 2 and can be held fixed to the flange 11 by means of two sheet metal lugs 14 in such a way that the cooling plate 13 is in thermal contact with the end wall 7.

Figure 3:
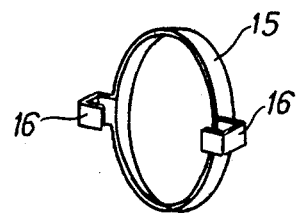

FIG. 3 shows a plug-on member 15 which can likewise be secured to the flange 11 by two sheet metal lugs 16 and then forms an insulating air space 17 in front of the end wall 7 for making the dissipation of heat more difficult.

Ten contacts are provided in the end portion 2, namely five bushing-like plug contacts in the end face 3 and five spade-like contacts in the peripheral face 4. These contacts have the following function (also see FIGS. 5 and 6): The first contact K1 serves to connect a mains lead 18. The contact K2 serves to connect the other mains lead 19. The common pole of the main winding 20 and auxiliary winding 21 of a single-phase asynchronous motor 22 is connected to the contact K3. The other pole of the main winding 20 is connected to the contact K4 and the other pole of the auxiliary winding 21 to the contact K5. As is shown by the connections of the conductors, the first contact K1 is connected to the third contact K3 and the second contact K2 is connected to the fourth contact K4 and, by way of the PTC resistor 6, to the fifth contact K5.

Figure 5:
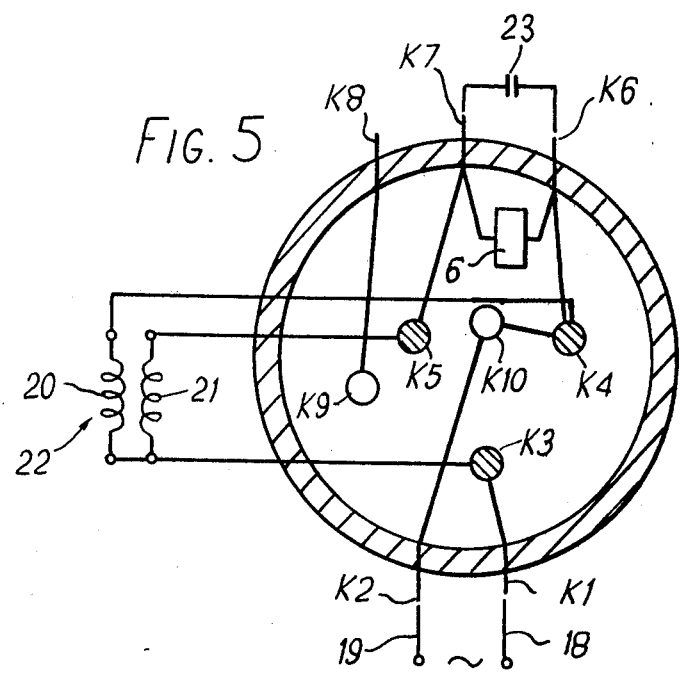
FIG. 5 is a diagrammatic cross-section showing the connection of a motor and an operating condenser.

A sixth contact K6 connected to the fourth contact K4 and a seventh contact K7 connected to the fifth contact K5 serve for connecting an operating condenser 23 in the case of the resistance start shown in FIG. 5.

An eighth contact K8 serves to connect the seventh contact K7 to the terminal of a starting condenser 24. If one wishes likewise to connect this combination to an operating condenser 23, use is made of the contacts K6 and K8. The contact K8 is connected to a ninth contact K9 which, on operation with a starting condenser, is used instead of the contact K5 for connecting the auxiliary winding 21. Together with the contacts K3 and K9, a tenth contact K10 connected to the contact K4 forms a triangle which is similar to the triangle formed by the contacts K3, K4 and K5. In this way, simple turning of the starter device through 30° about the contact K3 will change the necessary connections if a start with a starting condenser is desired instead of a resistance start.

Figure 6:
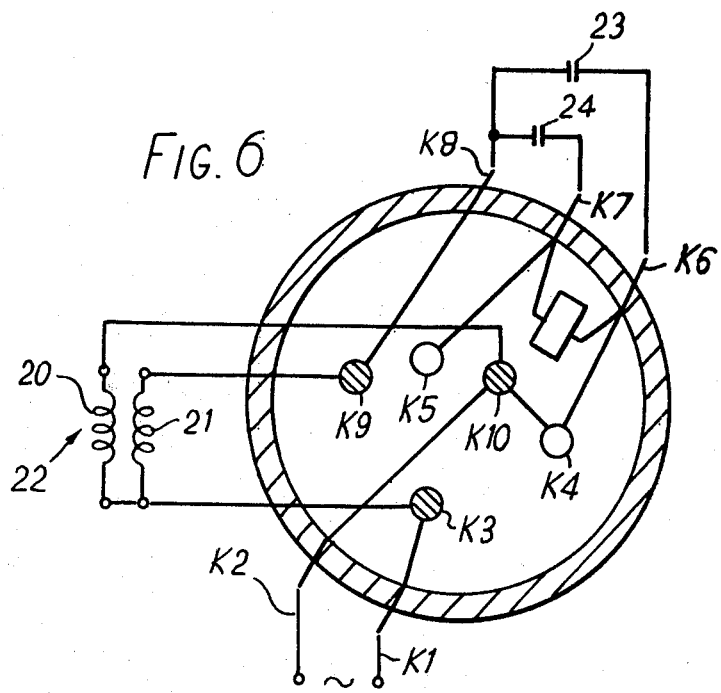
FIG. 6 is a diagrammatic cross-section showing the connection of a motor, an operating condenser and a starting condenser.

As is shown by FIGS. 5 and 6, the starter device is suitable as a basic component for four different manners of operation, namely operation with (1) starting resistance (2) starting resistance and operating condenser, (3) starting condenser and (4) starting condenser and operating condenser.

Further, the starter device is suitable for special motors, namely the motor of an encapsulated small refrigerator, as well as for conventional motors. In the one case, the motor windings can be connected to three of the five bushing contacts K3, K4, K5, K9 and K10 and the other components to the remaining spade contacts. However, in the case of a conventional motor the spade contacts can also be used for connecting the motor windings whereas the respectively connected bushing contacts can be utilised for connecting the condensers.

With the aid of the plug-on members 13, 15 and others, the starter device can be adapted to the operating conditions of the motor, particularly its down time. If one uses a screening cover 15, a thermally insulating chamber 17 is produced. By reason of the low dissipation of heat, the energy consumption during operation required to maintain the temperature resulting in the high resistance is low, for example in the order of 2 to 5 W. However, this results in a slow cooling-off period and therefore requires down times of for example three minutes. If the end wall 7 is applied to a good thermally conductive surface, e.g. a flat part of a motor housing, a very short cooling-off period is achieved as is necessary for motors with short down times, but one must make the sacrifice of a higher power consumption during operation. If a cooling plate 13 of limited area is applied to the end wall 7, one obtains operation between the two outer limits such as is best for the appropriate manner of operation. Instead of a screening cover 15 according to FIG. 3, a larger cover can also be applied to the entire starter device, which has the additional advantage of safeguarding the live terminals against contact.

What is claimed is:

1. A starter device for single phase asynchonous motors, comprising, a housing, a PTC resistor mounted in said housing having first and second capacitor contacts connected to opposite sides thereof, a third capacitor contact mounted in said housing, first and second power input contacts mounted in said housing, first and second sets of main and auxiliary windings contacts mounted in said housing with three contacts in each said set, said first set having first and second contacts connected to opposite sides of said PTC resistor and respectively to said first and second capacitor contacts, said second set having a first contact connected to one side of said PTC resistor and a second contact connected to said third capacitor contact, said first and second sets having a third contact which is common to both said sets and is connected to one of said input contacts, said first contact of each of said sets being connected to each other and to the other of said input contacts, and all said contacts being accessible from the exterior of said housing.

2. A starter device according to claim 1 wherein said first and second sets of contacts form two congruent triangles angularly displaced from each other relative to said common contact.

3. A starter device according to claim 1 wherein said housing has a cylindrically shaped peripheral face and a planar end face, said first and second sets of windings contacts being in said end face in the form of plug sockets, and said capacitor contacts and said input contacts being in said peripheral face on opposite sides thereof.

* * * * *